(12) United States Patent
Hirai et al.

(10) Patent No.: US 11,019,254 B2
(45) Date of Patent: May 25, 2021

(54) IMAGE PROCESSING APPARATUS, CONTROL METHOD FOR IMAGE PROCESSING APPARATUS, AND STORAGE MEDIUM HAVING CORRECTION OF EFFECT OF VIRTUAL LIGHT SOURCE

(71) Applicant: CANON KABUSHIKI KAISHA, Tokyo (JP)

(72) Inventors: Shinya Hirai, Kawasaki (JP); Kaori Tajima, Tokyo (JP); Shun Matsui, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/414,614

(22) Filed: May 16, 2019

(65) Prior Publication Data

US 2019/0364201 A1 Nov. 28, 2019

(30) Foreign Application Priority Data

May 23, 2018 (JP) .............................. JP2018-098699

(51) Int. Cl.
| | | |
|---|---|---|
| *H04N 5/228* | (2006.01) | |
| *H04N 5/232* | (2006.01) | |
| *H04N 5/225* | (2006.01) | |
| *H04N 5/3745* | (2011.01) | |

(52) U.S. Cl.
CPC ....... *H04N 5/23229* (2013.01); *H04N 5/2256* (2013.01); *H04N 5/37452* (2013.01)

(58) Field of Classification Search
CPC ............. H04N 5/23229; H04N 5/2256; H04N 5/37452
USPC ..................................................... 348/222.1
See application file for complete search history.

(56) References Cited

U.S. PATENT DOCUMENTS

| | | | | |
|---|---|---|---|---|
| 2011/0002508 A1* | 1/2011 | Basso | ............... | G06K 9/00228 382/103 |
| 2011/0298946 A1* | 12/2011 | Guan | ..................... | H04N 5/235 348/223.1 |
| 2016/0364602 A1* | 12/2016 | Kim | ........................ | G06T 15/50 |
| 2017/0186222 A1* | 6/2017 | Hata | .................... | G06K 9/4661 |
| 2017/0244882 A1* | 8/2017 | Kitajima | ............. | G06K 9/4604 |

FOREIGN PATENT DOCUMENTS

| | | |
|---|---|---|
| JP | 2010-135996 A | 6/2010 |
| JP | 2016-072692 A | 5/2016 |

* cited by examiner

*Primary Examiner* — Usman A Khan
(74) *Attorney, Agent, or Firm* — Canon U.S.A., Inc. IP Division

(57) ABSTRACT

An image processing apparatus that causes an effect of emission of virtual light to be applied in a captured image includes an acquisition unit, a determination unit, and a correction unit. The acquisition unit is configured to acquire ambient light distribution information in the captured image. The determination unit is configured, based on the ambient light distribution information acquired by the acquisition unit, to determine a color characteristic of a virtual light source that is a light source of the virtual light. The correction unit is configured, based on the color characteristic of the virtual light source determined by the determination unit, to make a correction by which the effect of the virtual light is applied in a partial area of the captured image.

7 Claims, 6 Drawing Sheets

IMAGE PROCESSING APPARATUS, CONTROL METHOD FOR IMAGE PROCESSING APPARATUS, AND STORAGE MEDIUM HAVING CORRECTION OF EFFECT OF VIRTUAL LIGHT SOURCE

BACKGROUND

Field

One disclosed aspect of the embodiment relates to an image processing apparatus, a control method for the image processing apparatus, and a storage medium.

Description of the Related Art

Pseudo lighting processing in which predetermined image processing is performed on a captured image as if virtual lighting were added from the outside to an image of an object in the captured image is known (Japanese Patent Application Laid-Open No. 2010-135996). By using the pseudo lighting processing, object shade generated by ambient light can be adjusted even after the image capturing.

Herein, in re-lighting processing by which shade of an object is corrected by virtual light, color of light to be emitted to the object is determined by color of ambient light and color of a virtual light source. Therefore, in a case where brightness of a partial object-area is corrected, depending on a color characteristic of the virtual light source, color unevenness or a shift in a color balance that has occurred prior to the re-lighting processing may be emphasized in relation to, for example, a distribution of the ambient light. Further, for example, a color balance between a portion irradiated with a virtual light source and a portion not irradiated with the virtual light source may be lost. As described in the above example, when brightness of a partial object-area is corrected, the ambient light distribution may cause image quality to be unnatural depending on a color characteristic of the virtual light source. The technique discussed in Japanese Patent Application Laid-Open No. 2010-135996 determines a color parameter of the re-lighting processing by a manual operation performed by a user. However, the user has a difficulty in setting a partial color characteristic of the virtual light source while looking at an image.

SUMMARY

According to an aspect of the embodiments, an image processing apparatus that causes an effect of emission of virtual light to be applied in a captured image includes an acquisition unit, a determination unit, and a correction unit. The acquisition unit is configured to acquire ambient light distribution information in the captured image. The determination unit is configured, based on the ambient light distribution information acquired by the acquisition unit, to determine a color characteristic of a virtual light source that is a light source of the virtual light. The correction unit is configured, based on the color characteristic of the virtual light source determined by the determination unit, to make a correction by which the effect of the virtual light is applied in a partial area of the captured image.

Further features of the disclosure will become apparent from the following description of exemplary embodiments with reference to the attached drawings.

DESCRIPTION OF THE EMBODIMENTS

One example of a configuration of a digital camera 100 according to a first exemplary embodiment is described with reference to FIG. 1. The digital camera 100 is one example of an image processing apparatus.

Figure 1:
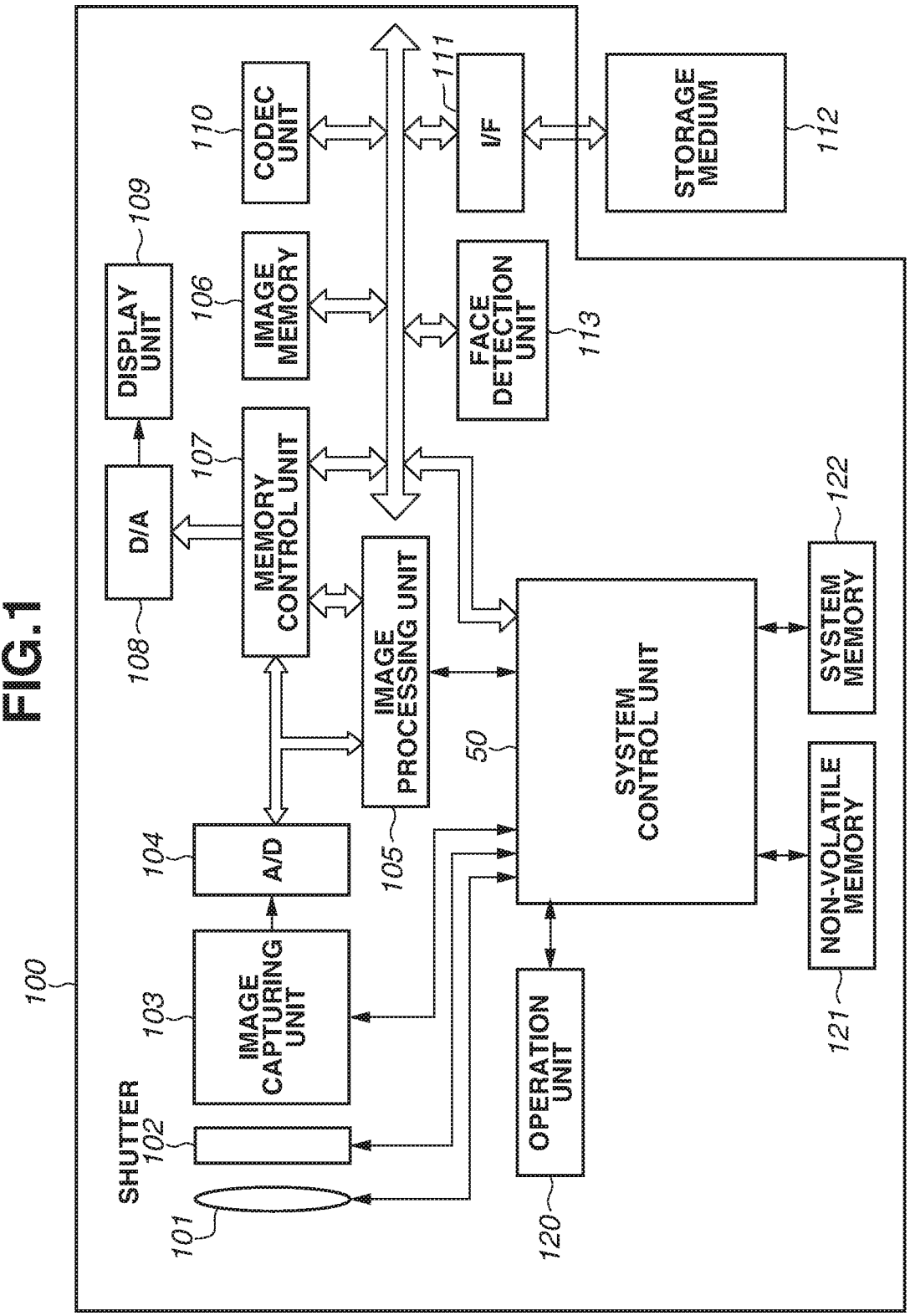
FIG. 1 is a block diagram illustrating one example of a configuration of a digital camera.

In FIG. 1, a lens group 101 is a zoom lens including a focus lens. A shutter 102 having an aperture function is arranged between the lens group 101 and an image capturing unit 103. The image capturing unit 103 includes an image capturing element typified by a charge-coupled device (CCD) or a complementary metal-oxide-semiconductor (CMOS) image sensor that converts an optical image formed on an image plane by the lens group 101 into electrical signals in units of pixels. An analog-to-digital (A/D) converter 104 converts an analog signal that is output by the image capturing unit 103 into a digital signal (image data).

An image processing unit 105 performs various image processing, on image data to be output from the A/D converter 104, such as color interpolation (i.e., de-mosaicing), white balance adjustment, and gamma correction. The image processing unit 105 further performs re-lighting processing on a captured image. The re-lighting processing, for example, produces an effect of virtual light emitted by a virtual light source to correct shade of an object. An image memory 106 temporarily stores image data. A memory control unit 107 controls reading from and writing to the image memory 106. A digital-to-analog (D/A) converter 108 converts image data into analog signals. A display unit 109 includes a display device such as a liquid crystal display (LCD) and an organic electro-luminescence (EL) display. The display unit 109 displays various graphical user interfaces (GUIs), a live view image, and a reproduced image read from a storage medium 112. A codec unit 110 encodes image data stored in the image memory 106 by a predetermined method and record the encoded image data into the storage medium 112. The codec unit 110 also decodes the encoded image data included in an image file so that the decoded image data is displayed, for example.

An interface (I/F) 111 mechanically and electrically connects the storage medium 112, which is a removable medium such as a semiconductor memory card and a card-type hard disk, to the digital camera 100. A system control unit 50 can be a programmable processor such as a central processing unit (CPU) and a micro processing unit (MPU). The system control unit 50 executes a program stored in a non-volatile memory 121 or a non-volatile memory embedded in the system control unit 50 and thus controls a necessary block or circuit, thereby providing a function of the digital camera 100.

A face detection unit 113 detects a face area included in a captured image. The face detection unit 113 can determine face information such as a position, a size, and a degree of reliability for each detected face area. The face detection unit 113 uses an optional method to detect a face area. The optional method includes a method that uses learning typified by a neural network, and a method that uses template matching to detect a feature portion such as eyes, a nose, and a mouth from an image area, and determines the feature portion as a face if a degree of similarity is higher than a set value.

An operation unit 120 is an input device such as a button and a switch through which a user inputs various instructions to the digital camera 100. If the display unit 109 is a touch display, a touch panel of the display unit 109 is included in the operation unit 120. An input device by which an instruction is input in a non-contact manner such as audio input and eye-gaze input may be included in the operation unit 120.

The non-volatile memory 121 can be an electrically erasable or recordable memory, for example, electrically erasable programmable read only memory (EEPROM). In the non-volatile memory 121, a value and data such as set values and graphical user interface (GUI) data are recorded. If the system control unit 50 is a MPU or CPU, a program to be executed by the system control unit 50 is recorded in the non-volatile memory 121.

A system memory 122 is used to load a constant and a variable for operation of the system control unit 50 and a program read from the non-volatile memory 121.

The configuration of the digital camera 100 has been described, but is not necessarily limited thereto. For example, an operation such as apparatus control and data storage is not necessarily performed by singe hardware. A plurality of hardware devices may share the operation and function as a single unit. In an opposite manner, single hardware may perform various processing, thus functioning as a plurality of units.

Figure 2:
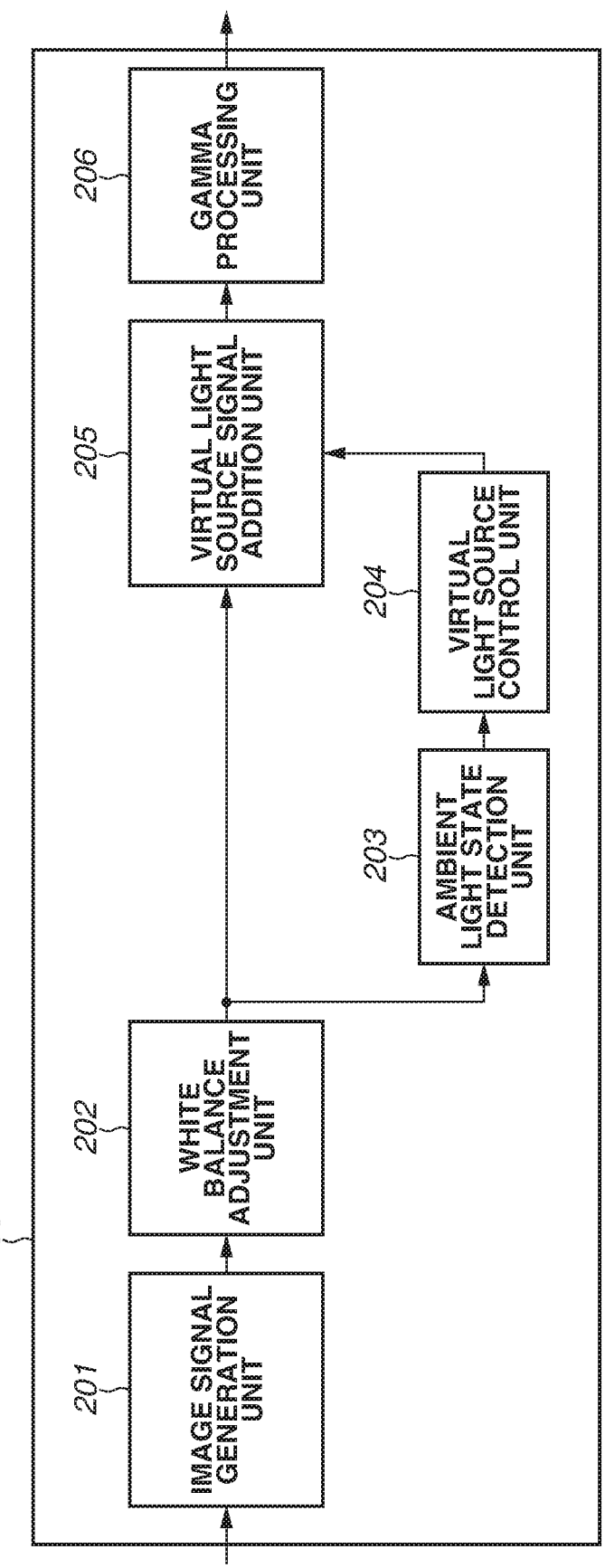
FIG. 2 is a block diagram illustrating one example of a configuration of an image processing unit.

Next, one example of a functional configuration related to re-lighting processing performed by the image processing unit 105 is described with reference to FIG. 2. One or more functional blocks illustrated in FIG. 2 may be achieved by a combination of a microprocessor and software. In the combination, the microprocessor executes a program stored in, for example, the non-volatile memory 121 or the non-volatile memory embedded in the system control unit 50, to control a necessary block or circuit, thereby performing processing illustrated in FIGS. 3 and 6. In the combination, two or more microprocessors can be used. One or more functional blocks illustrated in FIG. 2 can be achieved by hardware such as an application specific integrated circuit (ASIC) or a programmable logic device (PLD). The types of PLD include a field programmable gate array (FPGA) and a programmable logic array (PLA).

The image processing unit 105 can perform re-lighting processing on any of a first image and a second image. The first image is an image captured when execution of re-lighting processing is designated. The second image is an image recorded in the storage medium 112 or the like on which re-lighting processing is executed according to an instruction from a menu screen. In a case where the image processing unit 105 needs information at the time of image capturing for the re-lighting processing, the image processing unit 105 reads out the information from the non-volatile memory 121 or the system memory 122, or acquires the information from a header of an image file.

The image processing unit 105 as a re-lighting processing unit includes an image signal generation unit 201, a white balance adjustment unit 202, an ambient light state detection unit 203, a virtual light source control unit 204, a virtual light source signal addition unit 205, and a gamma processing unit 206.

The image signal input from the A/D converter 104 to the image processing unit 105 illustrated in FIG. 1 is input to the image signal generation unit 201. The image signal generation unit 201 performs synchronization processing (i.e., de-mosaic processing) on an image signal having one-color (any one of red (R), green (G), and blue (B)) information per pixel. Then, the image signal generation unit 201 generates an image signal in which each pixel has three-color (i.e., R, G, and B) information (i.e., pixel values of R, G, and B). The image signal generation unit 201 outputs the generated image signal to the white balance adjustment unit 202. The image signal to be generated by the image signal generation unit 201 is data of a captured image.

The white balance adjustment unit 202 calculates a white balance gain value from the pixel values of R, G, and B of the captured image input from the image signal generation unit 201, and applies the white balance gain to the pixel values of R, G, and B of the captured image to adjust the white balance gain. The white balance adjustment unit 202 outputs the captured image, on which white balance adjustment has been performed, to the virtual light source signal addition unit 205 and the ambient light state detection unit 203.

The ambient light state detection unit 203, based on the pixel values of R, G, and B of the captured image input from the white balance adjustment unit 202, calculates an evaluation value indicating a state of ambient light emitted to an object at the time of image capturing. The term "ambient light" used herein represents a light source with which the object is irradiated at the time of image capturing. The ambient light includes a light source such as sunlight and interior lighting that is not controlled by the digital camera 100 and a light source that is controlled by the digital camera 100. The light sources that is controlled by the digital camera 100 can be any of a flash installed in the digital camera 100 and an external flash or both the installed flash and the external flash. The ambient light state detection unit 203 outputs the calculated evaluation values to the virtual light source control unit 204.

Based on the evaluation value which is calculated by the ambient light state detection unit 203 and indicates a state of the ambient light, the virtual light source control unit 204 determines parameters Ar, Ag, and Ab that indicate a color characteristic of a virtual light source that re-lights the object. The virtual light source control unit 204 then outputs the calculated parameters Ar, Ag, and Ab to the virtual light source signal addition unit 205. Operations performed by the ambient light state detection unit 203 and the virtual light source control unit 204 will be described below. The parameters Ar, Ag, and Ab indicate intensity of three colors (i.e., R, G, and B) of the virtual light source.

The virtual light source signal addition unit 205 performs re-lighting processing based on a parameter which is calculated by the virtual light source control unit 204 and indicates the color characteristic of the virtual light source and a parameter that is necessary for the re-lighting processing including an emission direction and an intensity of the virtual light source. With the re-lighting processing, the virtual light source signal addition unit 205 produces an effect of virtual light virtually emitted to the object from the virtual light source which is applied in the pixel values of R, G, and B of the captured image input from the white balance adjustment unit 202. The virtual light source signal addition unit 205 outputs the captured image, on which the re-lighting processing has been performed, to the gamma processing unit 206. The data that the virtual light source signal addition unit 205 outputs is the data of the captured image having been undergone the re-lighting processing.

The gamma processing unit 206 performs gamma correction for the captured image that is subsequent to the re-lighting processing and input by the virtual light source signal addition unit 205. Then, the gamma processing unit 206 outputs the resultant captured image to the image memory 106 via the memory control unit 107.

Figure 3:
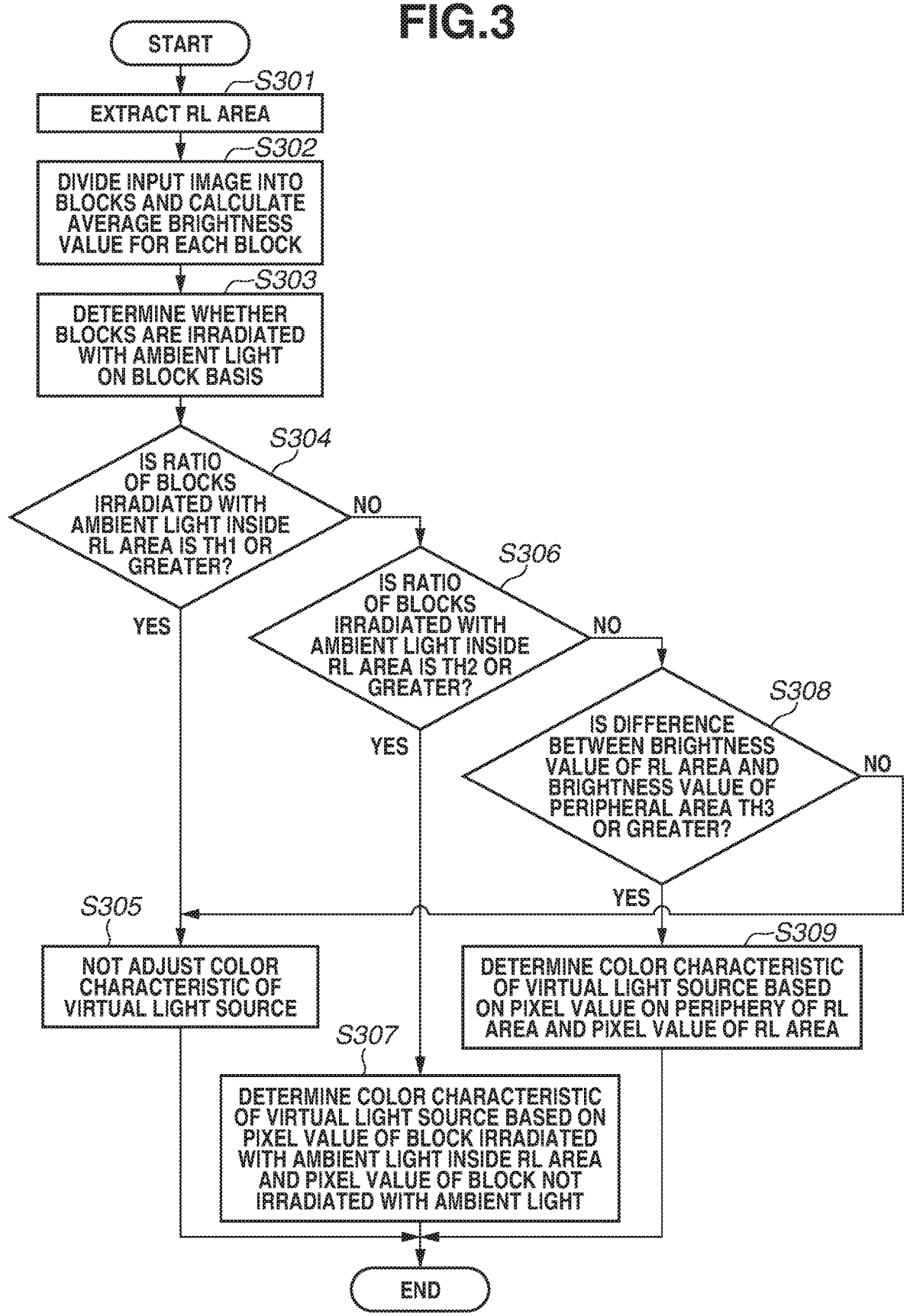
FIG. 3 is a flowchart illustrating one example of first image processing.
Figure 4:
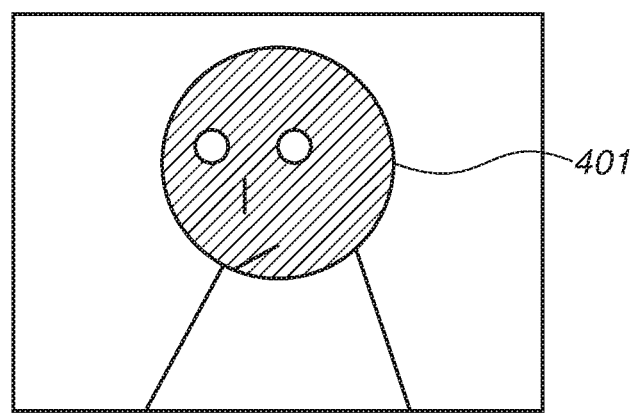
FIG. 4 is a diagram illustrating one example of a captured image.

Next, first image processing is described with reference to FIGS. 3 and 4. FIG. 3 is a flowchart illustrating one example of the first image processing. FIG. 4 is a diagram illustrating one example of a captured image. In the first image processing, the ambient light state detection unit 203 and the virtual light source control unit 204 analyze a characteristic of ambient light to determine a parameter that indicates a color characteristic of a virtual light source. The present exemplary embodiment is described using an example in which re-lighting processing is performed on a dark portion on a face area in an image.

In step S301, the ambient light state detection unit 203 extracts a re-lighting target area from a captured image input from the white balance adjustment unit 202. In the present exemplary embodiment, as illustrated in FIG. 4, the ambient light state detection unit 203 sets the re-lighting target area to a face area 401 of a person. The re-lighting target area is also called an RL area. If the re-lighting target area is a face area, the ambient light state detection unit 203 uses information about facial shapes and facial organs (e.g., eyes, nose, and mouth) and information about skin color to extract the face area 401. The processing in step S301 may be performed by, for example, the face detection unit 113 that is other than the ambient light state detection unit 203. The re-lighting target area is one example of a partial area of a captured image.

In step S302, the ambient light state detection unit 203 divides the captured image input from the white balance adjustment unit 202 into a plurality of blocks, and calculates an average brightness value for each block. The average brightness value for each block is an evaluation value indicating a state of the ambient light. The average brightness value for each block is one example of ambient light distribution information in a captured image. The processing for calculating an average brightness value for each block is one example of acquisition processing for acquiring the distribution information.

In step S303, the ambient light state detection unit 203 analyzes a state of the ambient light in the captured image input from the white balance adjustment unit 202 based on the average brightness value for each block calculated in step S302. The ambient light state detection unit 203 analyzes a state of distribution of the ambient light as a state of the ambient light. More particularly, the ambient light state detection unit 203 determines whether the blocks are sufficiently irradiated with the ambient light on a block basis. If a block has an average brightness value that is a predetermined brightness threshold value or greater, the ambient light state detection unit 203 determines that the block is sufficiently irradiated with the ambient light. The predetermined brightness threshold value indicates a brightness value of proper exposure. The average brightness value in step S303 is one example of intensity of ambient light. The predetermined brightness threshold value is one example of predetermined intensity value.

In step S304, the virtual light source control unit 204 determines whether an irradiated block ratio is a predetermined first threshold value TH1 or greater. The irradiated block ratio represents a ratio of the number of blocks determined to have been sufficiently irradiated with the ambient light in the re-lighting target area, to the number of blocks in the re-lighting target area. If the virtual light source control unit 204 determines that the irradiated block ratio is the first threshold value TH1 or greater (YES in step S304), the processing proceeds to step S305. If the virtual light source control unit 204 determines that the irradiated block ratio is less than the first threshold value TH1 (NO in step S304), the processing proceeds to step S306. The first threshold value TH1 can be stored in a storage area of the image processing unit 105 or in a memory such as the non-volatile memory 121.

If the processing in step S305 is executed subsequent to the processing in step S304, it is considered that the object in the re-lighting target area has been sufficiently irradiated with the ambient light. Thus, adjustment of a color characteristic of the virtual light source is not necessary. In step S305, the virtual light source control unit 204 determines parameters Ar, Ag, and Ab indicating the color characteristic of the virtual light source, such that Ar:Ag:Ab=1:1:1. Accordingly, the color characteristic of the virtual light source is determined such that intensity of each color (i.e., R, G, and B) of the virtual light source becomes equal.

In step S306, the virtual light source control unit 204 determines whether the irradiated block ratio is a predetermined second threshold value H2 or greater. If the virtual light source control unit 204 determines that the irradiated block ratio is the second threshold value TH2 or greater (YES in step S306), the processing proceeds to step S307. If the virtual light source control unit 204 determines that the irradiated block ratio is less than the second threshold value TH2 (NO in step S306), the processing proceeds to step S308. The second threshold value TH2 is a value less than the first threshold value TH1. The second threshold value TH2 may be stored in a storage area of the image processing unit 105 or in a memory such as the non-volatile memory 121.

In step S307, the re-lighting target area is assumed to include an area that is sufficiently irradiated with the ambient light and an area that is not sufficiently irradiated with the ambient light. In step S307, the virtual light source control unit 204 determines the color characteristic of the virtual light source based on a component ratio of the area irradiated with the ambient light in the re-lighting target area and the area not irradiated with the ambient light.

Specifically, with respect to the area sufficiently irradiated with the ambient light in the re-lighting target area, the virtual light source control unit 204 calculates an integral value of the pixel value of R, an integral value of the pixel value of G, and an integral value of the pixel value of B. The virtual light source control unit 204 sets ratios of the calculated integral values to values R1, G1, and B1. The values R1, G1, and B1 indicate component ratios of the respective pixel values of R, G, and B of the area that is sufficiently irradiated with the ambient light in the re-lighting target area. The virtual light source control unit 204 further calculates an integral value of the pixel value of R, an integral value of the pixel value of G, and an integral value of the pixel value of B for the area not sufficiently irradiated with the ambient light in the re-lighting target area. The virtual light source control unit 204 sets ratios of the calculated integral values to values R2, G2, and B2. The values R2, G2, and B2 indicate component ratios of the respective pixel values of R, G, and B of the area that is not sufficiently irradiated with the ambient light in the re-lighting target area. Then, the virtual light source control unit 204 determines parameters Ar, Ag, and Ab indicating the color characteristic of the virtual light source such that Ar:Ag:Ab=R1/R2:G1/G2:B1/B2. Thus, the determination of the color characteristic of the virtual light source can control a color balance such that color of a dark portion of the face becomes closer to the color of an area being irradiated with ambient light in the face while correcting brightness of the dark portion of the face. The area sufficiently irradiated with the ambient light in the re-lighting target area is one example of a first area, whereas the area not sufficiently irradiated with the ambient light in the re-lighting target area is one example of a second area. The pixel value is one example of the color information.

The virtual light source control unit 204 may determine the parameter Ar, Ag, and Ab such that, the higher the intensity of ambient light in an area sufficiently irradiated with the ambient light in the re-lighting target area becomes, the greater weight of values R1, G1, and B1 indicating pixel values of such an area becomes. Alternatively, the virtual light source control unit 204 may determine the parameters Ar, Ag, and Ab such that, the greater the number of blocks in an area sufficiently irradiated with the ambient light in the re-lighting target area becomes, the greater weight of values R1, G1, and B1 indicating pixel values of such an area becomes.

In step S308, the virtual light source control unit 204 compares an average brightness value of the re-lighting target area with an average brightness value of a peripheral area of the re-lighting target area. If the virtual light source control unit 204 determines that the average brightness value of the peripheral area of the re-lighting target area is greater than the average brightness value of the re-lighting target area by a predetermined third threshold value TH3 or more (YES in step S308), the processing proceeds to step S309. If the virtual light source control unit 204 determines that the average brightness value of the peripheral area of the re-lighting target area is not greater than the average brightness value of the re-lighting target area by the predetermined third threshold value TH3 or more (NO in step S308), the processing proceeds to step S305.

In step S308, if the average brightness value of the peripheral area of the re-lighting target area is determined to be greater than the average brightness value of the re-lighting target area by the predetermined third threshold value TH3 or more, the following case is presumed. That is, the re-lighting target area as a whole is dark and the peripheral area of the re-lighting target area is bright, and a scene such as backlight is presumed. In the case, since the re-lighting target area is not irradiated with the ambient light, the color characteristic may not have been appropriately adjusted by the white balance adjustment unit 202. If the color characteristic of the virtual light source is not adjusted, a shift in white balance prior to the re-lighting processing may be emphasized and thus, may make image quality unnatural.

In step S309, based on the RGB component ratios of the peripheral area of the re-lighting target area, the virtual light source control unit 204 estimates the color characteristic of the ambient light and sets the color characteristic of the virtual light source.

Particularly, with respect to the peripheral area of the re-lighting target area, the virtual light source control unit 204 calculates an integral value of the pixel value of R, an integral value of the pixel value of G, and an integral value of the pixel value of B. Then, the virtual light source control unit 204 sets ratios of the calculated integral values to values R3, G3, and B3. The values R3, G3, and B3 indicate component ratios of the respective pixel values of R, G, and B of the peripheral area of the re-lighting target area. The virtual light source control unit 204 calculates an integral value of the pixel value of R, an integral value of the pixel value of G, and an integral value of the pixel value of B with respect to the re-lighting target area. Then, the virtual light source control unit 204 sets ratios of the calculated integral values to values R2, G2, and B2 indicating component ratios of the respective pixel value of R, G, and B of the re-lighting target area. Subsequently, the virtual light source control unit 204 determines parameters Ar, Ag, and Ab indicating the color characteristic of the virtual light source such that Ar:Ag:Ab=R3/R2:G3/G2:B3/B2. By such determination of the color characteristic of the virtual light source, a color balance can be controlled such that color of a dark portion of the face becomes closer to color of an area being irradiated with ambient light in the face while correcting brightness of the dark portion of the face.

The virtual light source control unit 204 may determine the parameters Ar, Ag, and Ab in such a manner that, the greater a difference between intensity of the ambient light in terms of a brightness value of an object area and intensity of the ambient light in terms of a brightness value of the peripheral area of the object area, the greater weight of values R2, G2, and B2 indicating pixel values of the object area. The brightness value of the object area is one example of intensity of ambient light in the object area. The brightness value of the peripheral area of the object area is one example of intensity of ambient light in the peripheral area of the object area.

In step S308, if the average brightness value of the peripheral area of the re-lighting target area is not determined to be greater than the average brightness value of the re-lighting target area by the predetermined third threshold value TH3 or more, the following case is presumed. That is, the re-lighting target area and the peripheral area thereof are not sufficiently irradiated with ambient light. In this case, since a case in which only the re-lighting target area has unnatural color tone does not arise, the color characteristic of the virtual light source is not adjusted by the re-lighting processing. In other words, in step S305, the virtual light source control unit 204 sets the color characteristic of the virtual light source such that Ar:Ab:Ab=1:1:1. The above is the description of the processing in which the color characteristic of ambient light is analyzed and the color characteristic of the virtual light source is determined by the ambient light state detection unit 203 and the virtual light source control unit 204. The processing in which the parameter indicating the color characteristic of the virtual light source is determined in FIG. 3 is one example of determination processing for determining a parameter indicating color characteristic of the virtual light source.

Next, re-lighting processing that is performed by the virtual light source signal addition unit 205 is described. The virtual light source signal addition unit 205 generates a captured image in which an effect of virtual light emitted from the virtual light source is applied in the re-lighting target area of a processing target image by re-lighting processing. The processing target image is a captured image that is input by the white balance adjustment unit 202. The virtual light source signal addition unit 205 calculates, as re-lighting processing, pixel values Rout, Gout, and Bout in which an effect of virtual light emitted from the virtual light source is applied in a re-lighting target area of a processing target image according to Equations 1 through 3 below.

$$Rout=(Rt+Ar\times\cos(\theta)\times(1/D^2)\times Rv)/M \quad (1)$$

$$Gout=(Gt+Ag\times\cos(\theta)\times(1/D^2)\times Gv)/M \quad (2)$$

$$Bout=(Bt+Ab\times\cos(\theta)\times(1/D^2)\times Bv)/M \quad (3)$$

In Equations 1, 2, and 3, Rt, Gt, and Bt are pixel values of respective pixels in the re-lighting target area of the processing target image. Ar, Ag, and Ab are parameters indicating the color characteristic of the virtual light source determined by the processing described with reference to FIG. 3. D is a distance between the virtual light source and the object in the re-lighting target area. Rv, Gv, and Bv are light source reflection colors. M is a predetermined coefficient for normalizing output RGB values subsequent to the re-lighting processing. θ is an angle formed by an emission direction of the virtual light determined by the virtual light source control unit 204 and a normal vector of the object in the processing target image. In other words, the angle of θ can be calculated from a direction of the normal vector and a direction of the virtual light source emission. The normal vector of the object is calculated with respect to each pixel of the re-lighting target area.

The color characteristic of the virtual light source can be controlled by changing ratios of the parameters Ar, Ag, and Ab, which indicate color intensity of the virtual light source. In the present exemplary embodiment, the ratios of the parameters Ar, Ag, and Ab are controlled to adjust the pixel values Rout, Gout, and Bout, which are the output RGB values of the processing target image in which the effect of the virtual light is applied. Thereby, suitable correction of brightness, shading, and color of the object as a processing target can be achieved.

Although, in the present exemplary embodiment, a method for determining an angle of θ is not described in detail, a method, for example, discussed in Japanese Patent Application No. 2014-197506, can be used to determine the angle of θ. In the method, an evaluation value indicating a shading state of an object area in an image is calculated, and a position (i.e., an angle with respect to an object) and intensity of a virtual light source are determined based on the evaluation value. However, other methods can be used to determine the angle of θ.

If ratios of the light source reflection colors Rv, Gv, and Bv are equal to the ratios of the original pixel values Rt, Gt, and Bt, Equations 1 through 3 can be simplified as the following Equations 4 through 6.

$$Rout = (Rt \times (1 + Ar \times \cos(\theta) \times (1/D^2)))/M \quad (4)$$

$$Gout = (Gt \times (1 + Ag \times \cos(\theta) \times (1/D^2)))/M \quad (5)$$

$$Bout = (Bt \times (1 + Ab \times \cos(\theta) \times (1/D^2)))/M \quad (6)$$

In the present exemplary embodiment, provided that ratios of the light source reflection colors Rv, Gv, and Bv are equal to the ratios of the original pixel values Rt, Gt, and Bt, the virtual light source signal addition unit 205 uses the simplified Equations 4 through 6 to perform re-lighting processing. The re-lighting processing described above, which is performed by the virtual light source signal addition unit 205, is one example of correction processing by which an effect of virtual light is applied in the object area.

As described above, the digital camera 100 automatically controls a color characteristic of a virtual light source based on ambient light distribution, thereby suitably correcting brightness, shading, and color of an object. Thus, the digital camera 100 enables unnaturalness of image quality such as a shift in color balance due to a difference in color tone between the ambient light and the virtual light source to be less noticeable without a special operation performed by a user.

In the first exemplary embodiment, a re-lighting target area is set to a face area. However, the aforementioned method for calculating a color characteristic of the virtual light source is also effective for an object other than the face area.

In the first exemplary embodiment, luminance distribution of a captured image is analyzed with reference to a proper exposure level, so that an effect of ambient light in the captured image is determined. However, an effect of ambient light in the captured image can be determined by other methods. For example, the ambient light state detection unit 203 can divide a captured image into blocks, and determine contrast based on a histogram for each block. Then, the ambient light state detection unit 203 can determine an effect of ambient light based on the contrast. Alternatively, the ambient light state detection unit 203 can divide an input image into blocks and determine distribution of ratios of pixel values of R, G, and B for each block, so that color of ambient light can be estimated and an effect of ambient light can be determined.

Next, a second exemplary embodiment according to the digital camera 100 is described. Descriptions of components and configurations similar to the first exemplary embodiment are omitted.

Figure 5:
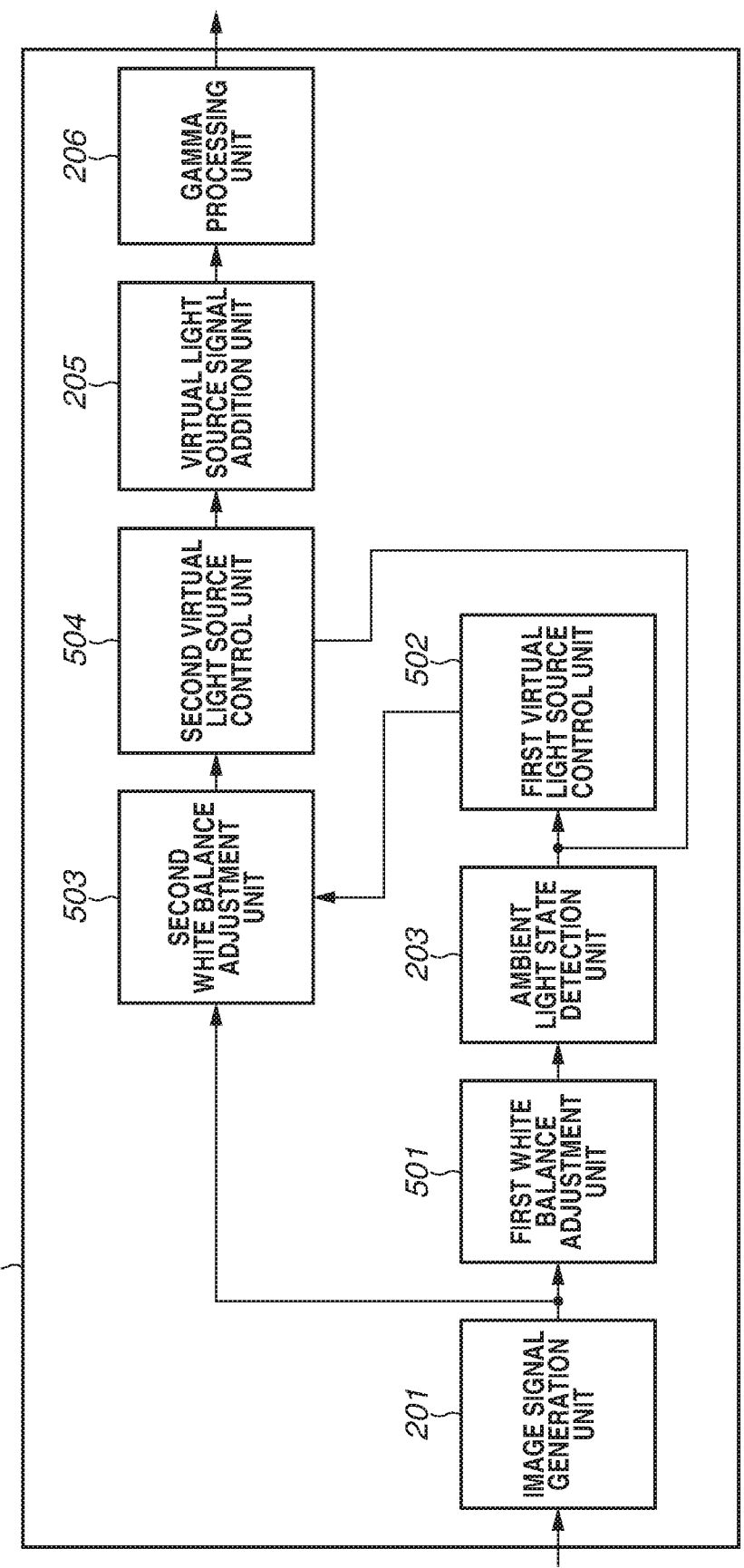
FIG. 5 is a block diagram illustrating one example of a configuration of an image processing unit.

An image processing unit 105 according to the second exemplary embodiment is described with reference to FIG. 5. In FIG. 5, one example of a configuration of the image processing unit 105 is illustrated. The image processing unit 105 of the second exemplary embodiment includes an image signal generation unit 201, a first white balance adjustment unit 501, an ambient light state detection unit 203, a first virtual light source control unit 502, a second white balance adjustment unit 503, and a second virtual light source control unit 504. The image processing unit 105 of the second exemplary embodiment includes a virtual light source signal addition unit 205 and a gamma processing unit 206.

The image signal generation unit 201, the virtual light source signal addition unit 205, and the gamma processing unit 206 of the second exemplary embodiment are similar to those of the first exemplary embodiment. However, the image signal generation unit 201 of the second exemplary embodiment outputs a generated image signal to the first white balance adjustment unit 501 and the second white balance adjustment unit 503. The first white balance adjustment unit 501 is similar to the white balance adjustment unit 202 of the first exemplary embodiment. The first white balance adjustment unit 501 outputs pixel values of R, G, and B of each pixel subsequent to white balance adjustment, to the ambient light state detection unit 203. The processing to be performed by the ambient light state detection unit 203, the first virtual light source control unit 502, the second white balance adjustment unit 503, the second virtual light source control unit 504, and the virtual light source signal addition unit 205 is described with reference to FIG. 6.

In the second exemplary embodiment, color balance of a whole image can be adjusted based on ambient light and virtual light source after a color characteristic of a virtual light source is determined by the second white balance adjustment unit 503.

Figure 6:
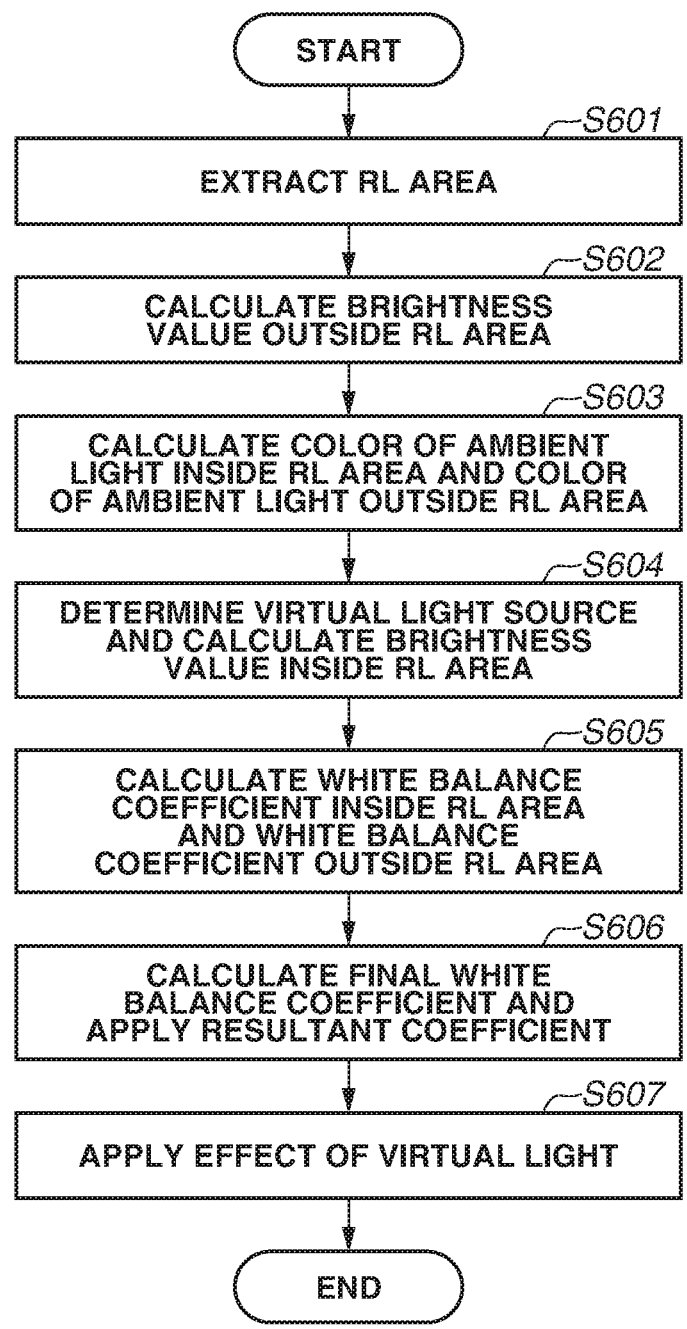
FIG. 6 is a flowchart illustrating one example of second image processing.

Next, one example of second image processing is described with reference to a flowchart illustrated in FIG. 6.

In step S601, the ambient light state detection unit 203 extracts a re-lighting target area from a captured image that is input from a white balance adjustment unit 202, in the same manner as the processing in step S301 illustrated in FIG. 3. In step S602, the ambient light state detection unit 203 calculates a brightness value in units of pixels with respect to the entire area excluding the re-lighting target area extracted in step S601, and determines an average value to calculate an average brightness value Yo.

In step S603, the ambient light state detection unit 203 calculates color of ambient light in the re-lighting target area, and color of ambient light in an area not included in the re-lighting target area. More particularly, the ambient light state detection unit 203 calculates average values Ri, Gi, and Bi of respective pixel values of R, G, and B for each pixel of the re-lighting target area. Then, the ambient light state detection unit 203 sets the calculated average values Ri, Gi, and Bi to color of the ambient light in the re-lighting target area. Further, the ambient light state detection unit 203 calculates average values Ro, Go and Bo of respective pixel values of R, G, and B for each pixel in the area that is not included in the re-lighting target area. Then, the ambient light state detection unit 203 sets the calculated average values Ro, Go and Bo to color of the ambient light in the area that is not included in the re-lighting target area. For example, if an electronic flash light is driven in a scene where a brightness of a person is dark due to backlight, colors of ambient light inside the re-lighting target area differs from color of ambient light outside the re-lighting target area. Hereinafter, a description is given of a case in which an electronic flash light is used in a backlit scene. The ambient light state detection unit 203 can detect a white object area to calculate an average value of color in the white object area, and set the calculated average value to color of the ambient light so that color of the ambient light can be estimated with higher accuracy. Unlike an average brightness value Yi that will be described below, an effect of virtual light is not applied in average values Ri, Gi, Bi, Ro, Go, and Bo.

In step S604, the first virtual light source control unit 502 determines a virtual light source, and calculates a brightness value inside the re-lighting area. Particularly, the first virtual light source control unit 502 sets the parameters Ar, Ag, and Ab indicating a color characteristic of the virtual light source to Ar=Ag=Ab=1. Then, the first virtual light source control unit 502 performs subsequent processing on the re-lighting target area of the captured image acquired from the first white balance adjustment unit 501 via the ambient light state detection unit 203. In other words, the first virtual light source control unit 502 uses Equations 4 through 6 described in the first exemplary embodiment to calculate pixel values Rout, Gout, and Bout for the re-lighting target area. Herein, the pixel values Rout, Gout, and Bout in which an effect of virtual light to be emitted from the virtual light source is applied are calculated for each pixel. Thereby, an effect of virtual light to be virtually emitted to an object from the virtual light source can be applied in a state in which color balance of original ambient light (i.e., an electronic flash light) remains. The first virtual light source control unit 502 calculates an average brightness value Yi of the re-lighting target area based on the pixel values Rout, Gout, and Bout of the re-lighting target area. The average brightness value Yi is a brightness value of the re-lighting target area in a case where an effect of virtual light is applied.

In step S605, based on the color information calculated in step S603, the second white balance adjustment unit 503 uses Equations 7 and 8 below to calculate white balance coefficients WBi_r and WBi_b that are appropriate inside the re-lighting target area. Each of the white balance coefficients WBi_r and WBi_b is one example of a second white balance coefficient.

$$WBi\_r = Gi/Ri \tag{7}$$

$$WBi\_b = Gi/Bi \tag{8}$$

Further, based on information about the color calculated in step S603, the second white balance adjustment unit 503 uses Equations 9 and 10 below to calculate white balance coefficients WBo_r and WBo_b that are appropriate outside the re-lighting target area. Each of the white balance coefficients WBo_r and WBo_b is one example of a third white balance coefficient.

$$WBo\_r = Go/Ro \tag{9}$$

$$WBo\_b = Go/Bo \tag{10}$$

The second white balance adjustment unit 503 acquires the color information calculated in step S603 from the ambient light state detection unit 203 via the first virtual light source control unit 502.

In step S606, the second white balance adjustment unit 503 calculates a final white balance coefficient in consideration of a color balance between inside and outside the re-lighting area. Particularly, the second white balance adjustment unit 503 uses Equations 11 and 12 below to calculate white balance coefficients WB_r and WB_b in consideration of a color balance between inside and outside the re-lighting area. In Equations 11 and 12, the brightness value Yi calculated in step S604, the brightness value Yo calculated in step S602, and the white balance coefficient calculated in step S605 are used. The brightness value Yi is a brightness value inside the re-lighting area, whereas the brightness value Yo is a brightness value outside the re-lighting area. Each of the white balance coefficients WB_r and WB_b is one example of a first white balance coefficient. The processing for calculating the white balance coefficients WB_r and WB_b is one example of first determination processing that determines a first white balance coefficient.

$$WB\_r = WBi\_r \times Yi/(Yi+Yo) + WBo\_r \times (1-Yi/(Yi+Yo)) \tag{11}$$

$$WB\_b = WBi\_b \times Yi/(Yi+Yo) + WBo\_b \times (1-Yi/(Yi+Yo)) \tag{12}$$

The second white balance adjustment unit 503 uses the calculated white balance coefficients WB_r and WB_b to adjust a pixel value of each pixel of the captured image acquired from the first white balance adjustment unit 501, thereby adjusting white balance of the captured image. The second white balance adjustment unit 503 outputs the captured image in which the white balance is adjusted to the second virtual light source control unit 504. The white balance adjustment is one example of color balance processing.

In step S607, the second virtual light source control unit 504 sets the parameters Ar, Ag, and Ab indicating a color characteristic of the virtual light source to Ar=Ag=Ab=1. The virtual light source signal addition unit 205 performs subsequent processing on the re-lighting target area of the captured image acquired from the second white balance adjustment unit 503 via the second virtual light source control unit 504. That is, the virtual light source signal addition unit 205 uses Equations 4 through 6 described in the first exemplary embodiment to calculate pixel values Rout, Gout, and Bout for each pixel with respect to the re-lighting target area. Accordingly, an effect of virtual light to be virtually emitted to an object from the virtual light source can be applied in the re-lighting target area of the image with the white balance adjusted by the second white balance adjustment unit 503. Since a change in the white balance coefficient by the second white balance adjustment unit 503 changes the pixel values Rt, Gt, and Bt used in Equations 4 through 6, the pixel values Rout, Gout, and Bout are calculated for each pixel by using Equations 4 through 6 in step S607 again. The processing performed by the second white balance adjustment unit 503 is one example of correction processing by which an effect of virtual light is applied in the object area. The virtual light source signal addition unit 205 outputs the captured image, in which the effect of the virtual light is applied, to the re-lighting target area to the gamma processing unit 206.

As described above, the digital camera 100 automatically adjusts white balance in consideration of an effect of virtual light. Therefore, if an effect of virtual light is applied in a captured image, unnaturalness of image quality such as a shift in color balance due to a difference in color tone between ambient light and virtual light source can be less noticeable without a special operation performed by a user.

The second exemplary embodiment has been described using a case in which all of the parameters Ar, Ag, and Ab indicating a color characteristic of a virtual light source are 1. However, a color characteristic of the virtual light source can be optionally set in such a manner that at least two of the parameters Ar, Ag, and Ab have different values.

Alternatively, the parameters Ar, Ag, and AB may be determined by the first image processing described above with reference to FIG. 3 in the first exemplary embodiment. In this case, the ambient light state detection unit 203 also executes the processing which is performed by the ambient light state detection unit 203 described in the first exemplary embodiment. Then the ambient light state detection unit 203 outputs an evaluation value indicating a state of ambient light to the first virtual light source control unit 502 and the second virtual light source control unit 504. In the same manner as the virtual light source control unit 204 described in the first exemplary embodiment, the first virtual light source control unit 502 determines the parameters Ar, Ag, and Ab based on the captured image acquired via the ambient light state detection unit 203 from the first white balance adjustment unit 501. The processing by which the first virtual light source control unit 502 determines the parameters Ar, Ag, and Ab is one example of second determination processing for determining a parameter indicating the color characteristic of the virtual light source. In the same manner as the virtual light source control unit 204 described in the first exemplary embodiment, the second virtual light source control unit 504 determines the parameters Ar, Ag, and Ab based on the captured image acquired from the second white balance adjustment unit 503. The processing by which the second virtual light source control unit 504 determines the parameters Ar, Ag, and Ab is one example of third determination processing for determining a parameter indicating the color characteristic of the virtual light source. The virtual light source signal addition unit 205 generates a captured image in which an effect of virtual light emitted from the virtual light source is applied in a re-lighting target area of a processing target image by re-lighting processing. The processing target image is a captured image with the white balance adjusted by the second white balance adjustment unit 503.

The above exemplary embodiment has been described using the digital camera 100. However, an image processing apparatus capable of executing the first image processing illustrated in FIG. 3, the re-lighting processing, and the second image processing illustrated in FIG. 5 can be used instead of the digital camera 100. In this case, the image processing apparatus does not necessarily have an image capturing function.

Therefore, according to each of the aforementioned exemplary embodiments, unnaturalness of image quality due to a difference in color tone between ambient light and a virtual light source can be less noticeable.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-098699, filed May 23, 2018, which is hereby incorporated by reference herein in its entirety.

What is claimed is:

1. An image processing apparatus that causes an effect of emission of virtual light to be applied in a captured image, the image processing apparatus comprising:
    at least one processor; and
    a memory,
    wherein the at least one processor and the memory are configured to function as following units:
        a calculation unit configured to calculate a brightness value of at least a partial area of the captured image for a case where the effect of the virtual light is applied;
        a first determination unit configured to determine, based on the brightness value calculated by the calculation unit, a first white balance coefficient with respect to the captured image for a case where the effect of the virtual light is applied;

an adjustment unit configured to adjust white balance of the captured image by using the first white balance coefficient determined by the first determination unit; and a correction unit configured to make a correction by which the effect of the virtual light is applied in the partial area of the captured image.

2. The image processing apparatus according to claim 1, wherein the first determination unit determines the first white balance coefficient, based on the brightness value of the partial area for a case where the effect of the virtual light is applied and a brightness value of an area that is not included in the partial area of the captured image.

3. The image processing apparatus according to claim 1, wherein the first determination unit determines a second white balance coefficient based on color information about the partial area, determines a third white balance coefficient based on color information about the area not included in the partial area of the captured image, and determines the first white balance coefficient, based on the second white balance coefficient, the third white balance coefficient, the brightness value of the partial area for a case where the effect of the virtual light is applied, and a brightness value of the area not included in the partial area of the captured image.

4. The image processing apparatus according to claim 1, wherein the correction unit makes a correction by which the effect of the virtual light is applied in the partial area, the correction being made with respect to the captured image with the white balance adjusted by the adjustment unit.

5. The image processing apparatus according to claim 1, wherein the at least one processor and the memory further functions as following units:

a second determination unit configured to determine a color characteristic of a virtual light source as a light source of the virtual light based on ambient light distribution information in the captured image; and a third determination unit configured to determine a color characteristic of the virtual light source based on ambient light distribution information of the captured image with the white balance adjusted by the adjustment unit, wherein, based on the effect of the virtual light to the partial area according to the color characteristic of the virtual light source determined by the second determination unit, the first determination unit determines a first white balance coefficient, and wherein, based on the color characteristics of the virtual light source determined by the third determination unit, the correction unit makes a correction by which the effect of the virtual light is applied in the partial area of the captured image with the white balance adjusted by the adjustment unit as a target.

6. A control method for an image processing apparatus that causes an effect of emission of virtual light to be applied in a captured image, the control method comprising:

calculating a brightness value of at least a partial area of the captured image for a case where the effect of the virtual light is applied;

determining, based on the brightness value calculated by the calculating, a white balance coefficient with respect to the captured image for a case where the effect of the virtual light is applied;

adjusting white balance of the captured image by using the determined white balance coefficient; and making a correction by which the effect of the virtual light is applied in the partial area of the captured image.

7. A non-transitory computer-readable storage medium storing a program for causing a computer to execute a control method for an image processing apparatus that causes an effect of emission of virtual light to be applied in a captured image, the control method comprising:

calculating a brightness value of at least a partial area of the captured image for a case where the effect of the virtual light is applied;

determining, based on the brightness value calculated by the calculating, a white balance coefficient with respect to the captured image for a case where the effect of the virtual light is applied;

adjusting white balance of the captured image by using the determined white balance coefficient; and making a correction by which the effect of the virtual light is applied in the partial area of the captured image.

* * * * *